(12) United States Patent
Su

(10) Patent No.: US 10,846,655 B2
(45) Date of Patent: Nov. 24, 2020

(54) SHELF LIFE MONITORING SYSTEM

(71) Applicant: Vossic Technology Co., Ltd., New Taipei (TW)

(72) Inventor: Chi-An Su, New Taipei (TW)

(73) Assignee: Vossic Technology Co., Ltd., New Taipei (TW)

( * ) Notice: Subject to any disclaimer, the term of this patent is extended or adjusted under 35 U.S.C. 154(b) by 23 days.

(21) Appl. No.: 16/192,057

(22) Filed: Nov. 15, 2018

(65) Prior Publication Data

US 2020/0005227 A1 Jan. 2, 2020

(30) Foreign Application Priority Data

Jun. 28, 2018 (CN) .................... 2018 2 1008722 U

(51) Int. Cl.
| | |
|---|---|
| *G06Q 10/00* | (2012.01) |
| *G06Q 10/08* | (2012.01) |
| *H04W 4/80* | (2018.01) |
| *G06F 16/903* | (2019.01) |
| *G06Q 10/06* | (2012.01) |

(52) U.S. Cl.
CPC ..... *G06Q 10/087* (2013.01); *G06F 16/90335* (2019.01); *G06Q 10/06315* (2013.01); *H04W 4/80* (2018.02)

(58) Field of Classification Search
CPC . G06Q 10/08; G06Q 10/087; G06F 16/90335
USPC ................................................. 705/26, 28
See application file for complete search history.

(56) References Cited

U.S. PATENT DOCUMENTS

| | | | |
|---|---|---|---|
| 8,321,302 B2 | 11/2012 | Bauer et al. | |
| 9,710,754 B2 | 7/2017 | Kaye | |
| 9,934,657 B2 | 4/2018 | Tkachenko et al. | |
| 2006/0277109 A1* | 12/2006 | Kerth | G06Q 20/201 705/20 |
| 2007/0063029 A1* | 3/2007 | Brandt | G06Q 10/08 235/385 |

\* cited by examiner

*Primary Examiner* — Rokib Masud
(74) *Attorney, Agent, or Firm* — ScienBiziP, P.C.

(57) ABSTRACT

A shelf life monitoring system for perishable products of different types comprises a low-temperature display cabinet, a point of sale terminal, and a server, connected through a network. During the storage, the server can determine whether the storage condition required for a perishable product is the same as the storage condition of the low-temperature display cabinet which the perishable product is stored. The server can further determine whether the low-temperature display cabinet is operating normally, and issue alerts as to potential reductions in shelf life of the perishable product when abnormal conditions occur. The server can also periodically check for any life-expired food and notify the point of sale terminal to identify and process a life-expired product in certain ways.

8 Claims, 12 Drawing Sheets

| F_ID | Storage Condition | Shelf Life Expiry Date | GW_ID |
|---|---|---|---|
| a888 | Temperature4°C ; Humidity40% | 2018/5/10 | |
| b999 | Temperature-1°C | 2018/6/1 | |
| | | | |

FIG. 5

| Exceeds storage temperature | The formula for the number of shorten days of shelf life that affected by over-temperature per hour |
|---|---|
| <=1°C | $f_1(t) = [0.1 \times t]$ |
| >1°C，<=2°C | $f_2(t) = [0.3 \times t]$ |
| >2°C，<=3°C | $f_3(t) = [0.1 \times t + 0.2 \times t^2]$ |

FIG. 10

SHELF LIFE MONITORING SYSTEM

FIELD

The subject matter herein generally relates to the field of system for storage of perishable goods.

BACKGROUND

Fresh foods, dairy products, fruits and vegetables, etc. are required to be stored in a controlled environment such as temperature controlled refrigerator, and must be before its shelf-life to ensure the safety of the consumers.

Traditional practice is to place different types of foods in display cabinets with different temperature settings to ensure their storage conditions. However, it is possible that food can be erroneously placed in the wrong display cabinet where the temperature setting range does not meet the storage requirements of the miss placed food, or by consumers taking the food out of the display cabinet while selecting food. Miss placement of perishable food can also when perishable food is returned from the cashiers, but to the wrong display cabinet, or temperature in the display cabinet does not reach the set temperature range due to malfunction of the display cabinet or human error. All of the above instances will cause the perishable food to be incorrectly stored which leads to the perishable food becomes spoiled or the shelf life of the food shortened. In these circumstances, food safety becomes an issue.

In addition, foods stored in display cabinets must be manually checked to see whether the foods are out of their shelf life. Such methods of overdue inspection are not only manpower and time consuming, but may further deteriorate the storage environment of the perishable foods. Consumers buy food based on trust in stores to provide properly stored fresh foods. Should the consumers experience food safety problems and the trust may be lost.

Therefore, there is room for improvement within the art.

BRIEF DESCRIPTION OF THE DRAWINGS

Implementations of the present technology will now be described, by way of embodiments only, with reference to the attached figures, wherein:

FIG. 5 is a schematic diagram of one embodiment of a perishable product database.

FIG. 10 is a schematic diagram of a table of exceeds storage temperature and the formula for the number of shorten days of shelf life that affected by over temperature per hour.

DETAILED DESCRIPTION

Figure 1:
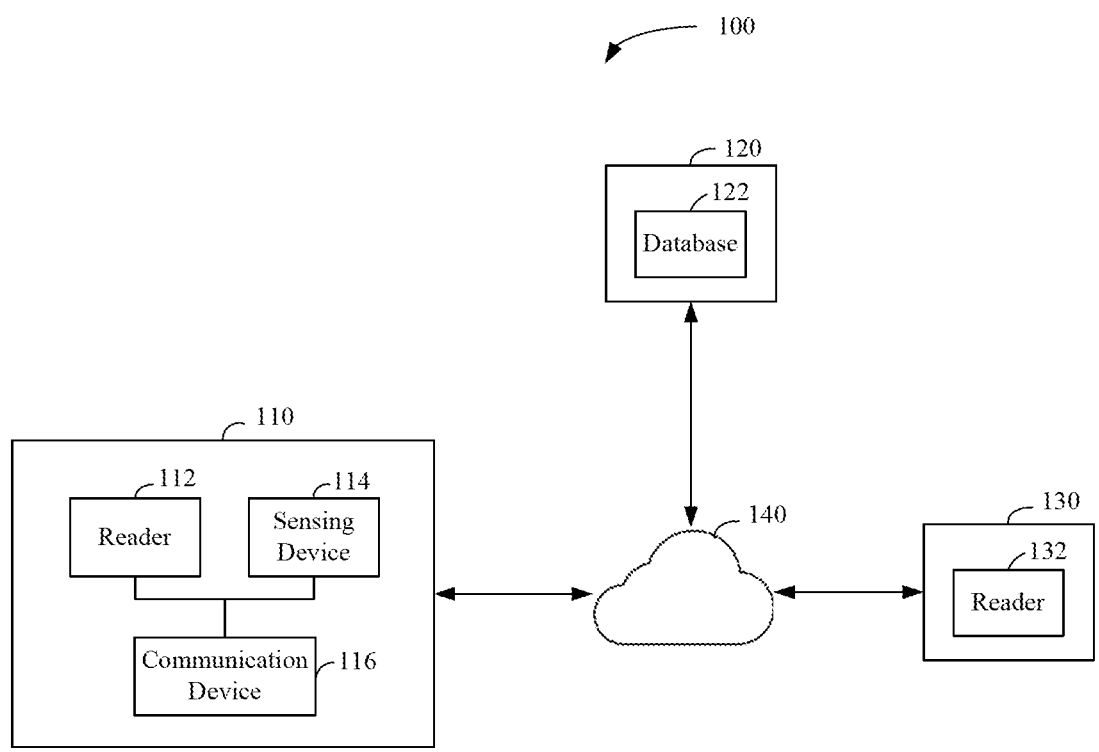
FIG. 1 is a block diagram of one embodiment of a shelf life monitoring system.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one". The term "comprising", when utilized, means "including, but not necessarily limited to"; it specifically indicates open-ended inclusion or membership in a so-described combination, group, series, and the like.

FIG. 1 illustrates a system 100 in accordance with an embodiment for monitoring shelf life of perishable products. The system 100 comprises a display cabinet 110, a server 120, and a point-of-sale (POS) terminal 130 that are bi-directionally connected over the network 140. The network 140 may be a local area network (LAN), a wide area network (WAN), and a combination such as the Internet. In one embodiment, the display cabinet 110, the server 120, and the POS terminal 130 may be in a retail store that directly sells perishable products to consumers, such as a large store, a supermarket, a convenience store, and the like. In another embodiment, the server 120 may be located in a different geographical environment from the display cabinet 110 and the POS terminal 130. For example, an administrator of chain store may have many stores that have multiple connections to the server 120 over the network 140. Each of the stores is provided with the display cabinet 110 and the POS terminal 130.

The display cabinet 110 includes a reader 112, a sensing device 114, and a communication device 116. The reader 112 is configured to perform wireless communication with an electronic tag. The electronic tag may enter the sensing area of the reader 112, and the reader 112 may interpret the data stored in the electronic tag. The sensing device 114 is configured to periodically measure environmental values such as temperature and humidity in the display cabinet 110. The sensing device 114 can be placed at various locations of the display cabinet 110. A number of the sensing devices 114 can also be set according to actual needs. In one embodiment, the sensing device 114 can be placed in the display cabinet 110 independently to measure environmental conditions of the display cabinet 110. In another embodiment, the sensing device 114 can be placed in contact with a perishable product, for example, the sensing device 114 can be fixed to a package, a container or a tray containing perishable product, to measure local environmental conditions around the perishable product. The reader 112 and the sensing device 114 are coupled to the network 140 over the communication device 116 to perform bidirectional communication with the server 120. In one embodiment, the reader 112, the sensing device 114, and the communication device 116 may be individual and independent devices that are directly or indirectly electrically connected to each other. In another embodiment, the reader 112, the sensing device 114, and the communication device 116 may be integrated into one hardware device. The server 120 which includes a database 122 may be one or more computer systems that perform one or more processes according to each embodiment as disclosed. The POS terminal 130 includes a reader 132 that can directly read the information stored in the electronic tag of the perishable product when the perishable product is sold.

The work flow of the system 100 is illustrated as follows:

(1) Data Filing

Figure 2:
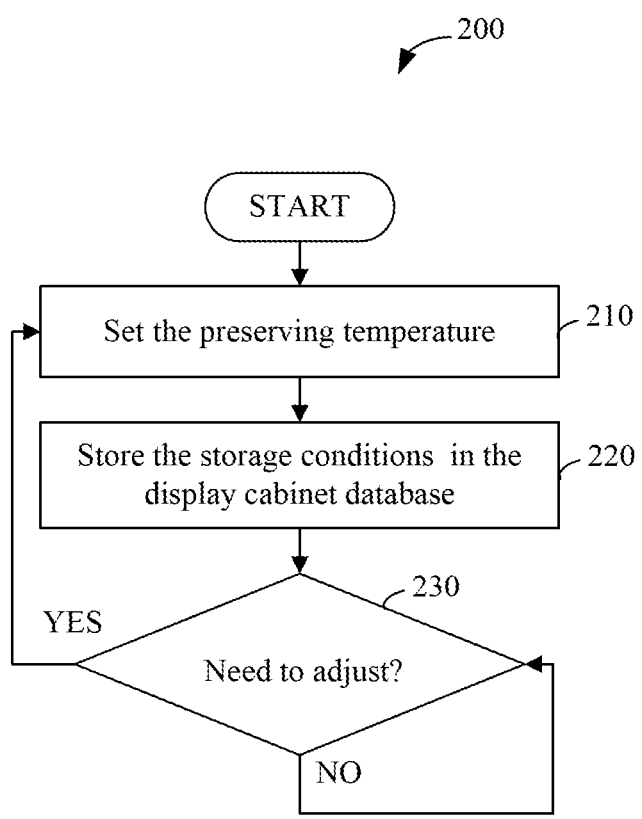
FIG. 2 is a flowchart of one embodiment of a method for filing a display cabinet.

In the initial setting of the display cabinet 110, a unique identification code (GW_ID) of the communication device 116 is acquired. The communication device 116 may use a media access control address (MAC Address), a network address (IP Address), or any data that can uniquely identify the communication device 116 as the GW_ID of the communication device 116. Next, the initial setting of a preserving temperature of the display cabinet 110 is performed, and the display cabinet 110 is archived in the database 122. FIG. 2 illustrates a filing process 200 of the display cabinet 110 in one embodiment. The preserving temperature of the display cabinet 110 is set (Block 210). The preservation temperature can be set according to the storage conditions required according to categories of perishable product. In one embodiment, the storage conditions comprise temperature and humidity. In one embodiment, the preserving temperature can be mechanically set by a staff of the store where the display cabinet 110 is placed, via a button or a knob located on an outer casing of the display cabinet 110. In another embodiment, the software executed in the server 120 may be adapted for performing temperature control of the display cabinet 110 over the network 140 to issue a temperature setting command. In another embodiment, the software executed in the communication device 116 may be used to directly control the temperature of the display cabinet 110. After the setting of the preservation temperature of the display cabinet is completed, the storage condition of the display cabinet 110 is recorded in the database 122 of the server 120 together with the GW_ID of the communication device 116 and stored in a display cabinet database 300 (Block 220 of refer to FIG. 2). If the preserving temperature of the display cabinet 110 is mechanically set, the storage condition of the display cabinet 110 and the corresponding GW_ID may be manually input and stored in the display cabinet database 300 by the staff. If the preserving temperature of the display cabinet 110 is set by the software, the communication device 116 can upload the storage condition and the GW_ID of the display cabinet 110 to the server 120. Once the preservation temperature setting of the display cabinet 110 is completed, a monitoring system to routinely check if the storage condition of the display cabinet 110 has changed and adjustments of the preservation temperature is needed (Block 230). Factors which may lead to such change include changes in the category of perishable product category stored in the display cabinet 110, and saving of power consumption of the display cabinet 110, adjustment of temperature setting of the display cabinet 110. If adjustments are required, the storage condition of the display cabinet 110 is adjusted accordingly at Block 210. If adjustments of preserving temperature of the display cabinet 110 are not required, the monitoring system continues.

Figure 3:
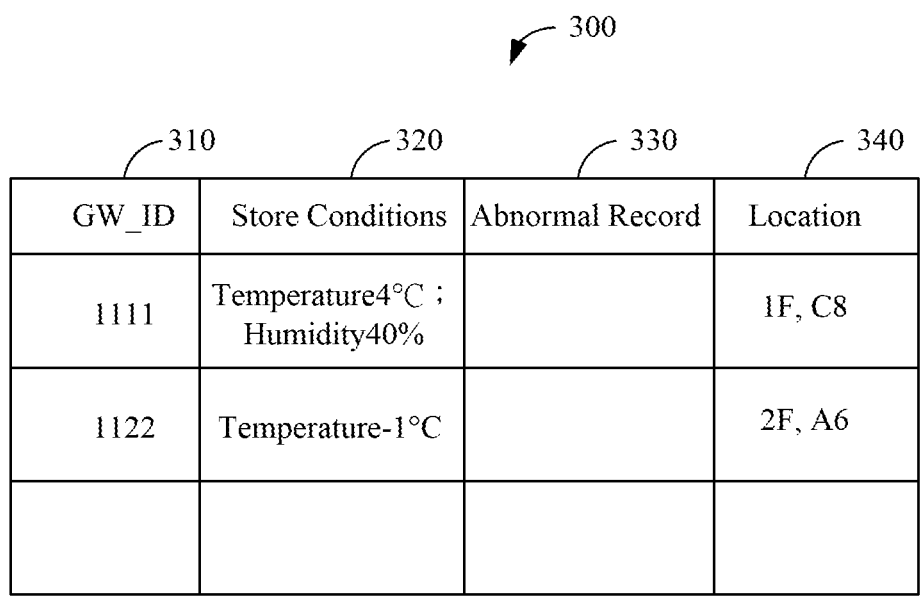
FIG. 3 is a schematic diagram of one embodiment of a display cabinet database.

FIG. 3 is a schematic diagram of one embodiment of the display cabinet database 300. The display cabinet database 300 includes a GW_ID field 310, a store conditions field 320, an abnormal record field 330, and a location field 340. The GW_ID filed 310 uniquely identifies the identification code of the communication device 116. Since the communication device 116 is installed in the display cabinet 110, the GW_ID of the communication device 116 and the display cabinet 110 have a one-to-one correspondence, and the GW_ID can also be used to uniquely identify the display cabinet 110. The storage condition field 320 indicates current storage conditions of the display cabinet 110. In one embodiment, each of the storage conditions can be represented by a code corresponding to temperature, humidity, or other environmental parameters of the display cabinet 110. For example, a code "A" can stand for fruits and vegetables, the storage conditions being temperature at 4° C., humidity at 40%. A code "B" can stand for meat, and the storage condition is temperature at −1° C. The abnormal record field 330 records an abnormal condition and abnormal state of the display cabinet 110 during operation. The location field 340 indicates the location information of the display cabinet 110. The location field 340 can display the location information of the display cabinet 110 when the system 100 issues an alert, so that staff can locate the display cabinet 110 and the perishable products stored within quickly. In one embodiment, the location filed 340 is an optional field, and the location-related information can be manually input by an administrator of the system 100 or a staff. FIG. 3 illustrates two data records as an example of the storage data of the display cabinet database 300, wherein the first data record indicates the display cabinet 110 located in the C8 area of the first floor and is equipped with the communication device 160 with the GW_ID of 1111. The storage condition of the display cabinet 110 is currently set to fruits and vegetables, temperature at 4° C., humidity at 40%. The second data record indicates the display cabinet 110 located in the A6 area of the second floor and is equipped with the communication device 160 with the GW_ID of 1122. The storage condition of the display cabinet 110 is currently set to meat, temperature at −1° C.

Figure 4:
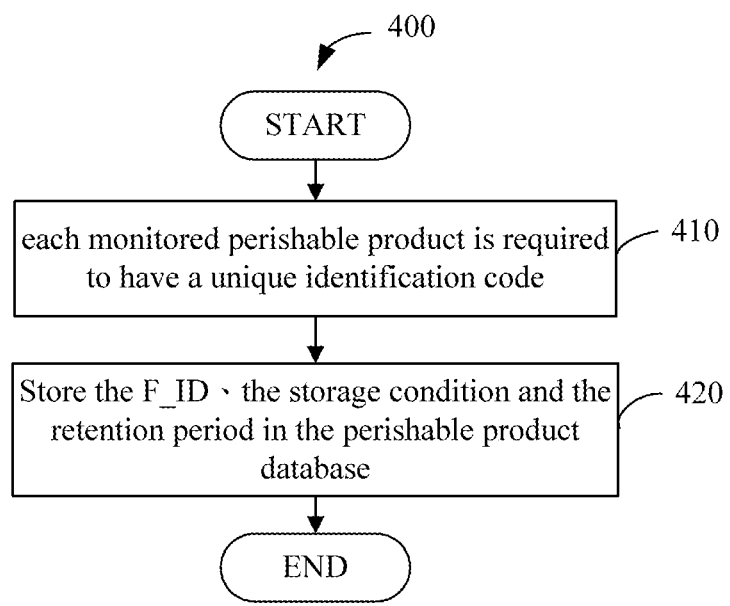
FIG. 4 is a flow chart of one embodiment of a method for filing a perishable product.

FIG. 4 shows a filing process 400 of the perishable products according to one embodiment. In the system 100, each monitored perishable product has a unique identification code (F_ID) that identifies the perishable product (Block 410). In one embodiment, an electronic tag can be attached to the package of each perishable product such that the electronic tag coexists with the perishable product, and the identification code of the electronic tag is used as the F_ID of the perishable product. The electronic tag may be a bar code tag, a radio frequency identification (RFID) tag, or a near-field communication (NFC) tag. In another embodiment, the electronic tag can also be coupled to a package of the perishable product or to the perishable product. AT Block 420, the identification code of the electronic tag as the F_ID of the perishable product, together with the storage condition and a retention period, and the like, are stored into a perishable product database 500 (FIG. 5) in the database 122 of the server 120. In one embodiment, when staff check out the perishable product, the handheld reader, such as a mobile phone, reads information in the electronic tag of the perishable product, obtains the F_ID of the perishable product, uploads the F-ID to the server 120, and manually sets the storage condition and the shelf life of the perishable product. Data as to such perishable product is archived in the perishable product database 500. In another embodiment, the information such as a F_ID 510, a storage condition 520, and a shelf life 530 may be stored in an electronic tag of the perishable product. When staff purchases the perishable product, the electronic tag of the perishable product can be read by the handheld reader, and the related information is uploaded to the server 120 and the perishable product is thus archived in the perishable product database 500.

FIG. 5 is a schematic diagram of the perishable product database 500 according to one embodiment. The perishable product database 500 includes the F_ID 510 field, the storage condition 520 field, the shelf life 530 field, and a GW_ID 540 field. The F_ID 510 field is an identification code for uniquely identifying the perishable product. The storage condition 520 field is used to record a storage condition corresponding to the perishable product category to which the perishable product belongs. The shelf life 530 field is used to record the given shelf life of the perishable product. The GW_ID 540 field is used to record the GW_ID of the communication device 116 of the display cabinet 110 in which the perishable product is stored. FIG. 5 shows two data records as one example of the perishable product database 500. The first data record indicates a perishable product with an F_ID of a888, the perishable product is stored under the condition of fruits and vegetables with temperature 4° C. and humidity 40%, and the shelf life expiry date is May 10, 2018. The second data record indicates the perishable product with an F_ID of b999, the perishable product is stored under the condition of meat with temperature −1° C., and the shelf life expiry date is Jun. 1, 2018.

(2) Place the Perishable Product into the Display Cabinet 110

Figure 6:
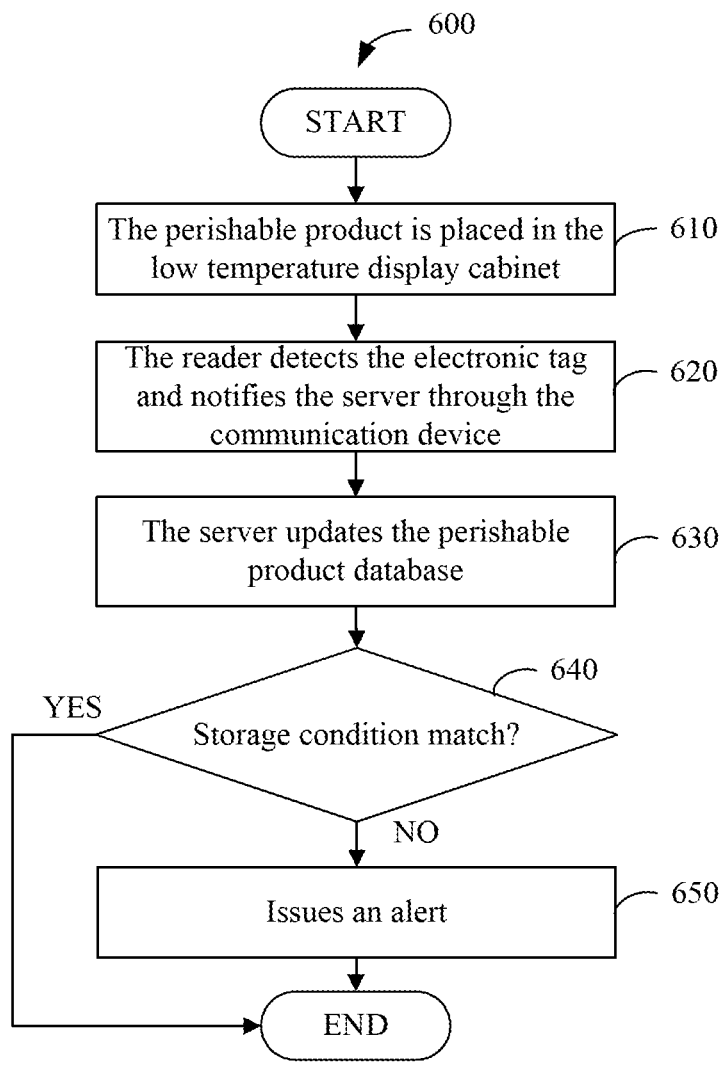
FIG. 6 is a flow chart of one embodiment of a method to place the perishable product in the display cabinet.

FIG. 6 shows a process 600 for placing perishable products into the display cabinet 110 in accordance to one embodiment.

Block 610, the perishable product is placed in the display cabinet 110. The action may be performed by a staff at the store where the display cabinet 110 is placed or a consumer, during shopping. The perishable product may be removed and then replaced back in the display cabinet 110.

Block 620, the reader 112 detects the electronic tag of the perishable product placed in the display cabinet 110, reads related information stored in the electronic tag of the perishable product, and notifies the server 120 through the communication device 116 that there is a perishable product newly placed in the display cabinet 110 with related information of the perishable product, together with the GW_ID of the communication device 116. In one embodiment, the reader 112 can also be used to track the removal of the perishable product from the display cabinet 110.

Block 630, the server 120 updates the related information about the perishable product in the perishable product database 500 based on the received data. In particular, the received GW_ID information is recorded in the GW_ID 540 field to enable a one-to-one association between the F_ID of the perishable product and the GW_ID of the communication device 116.

Block 640, the server 120 further determines whether the storage condition of the perishable product matches the storage condition of the display cabinet 110, wherein the storage condition of the perishable product can be retrieved from the storage condition 520 field in the perishable product database 500. The determination can be completed by looking up the received GW_ID in the display cabinet database 300, and retrieving the field value of the storage condition 320 field in the data column. The storage conditions of the display cabinet 110 in which the perishable product is placed are known. If the storage condition of the perishable product matches the storage condition of the display cabinet 110, the process 600 is terminated. Otherwise, if the storage condition of the perishable product does not match the storage condition of the display cabinet 110, an alert is issued. In one embodiment, the alert can be transmitted over the network 140 to a location where the display cabinet 110 is placed, and to any hardware device suitable for displaying (sound or video) the alert. In another embodiment, the alert may also notify the staff as to where the display cabinet 110 is placed by means of a short message service or a push notification that the perishable product is placed in the incorrect display cabinet 100, and manual elimination the error is required. The alert content may include the F_ID of the perishable product and the location information of the display cabinet 110 (the location 340 field) to facilitate staff eliminating the error condition.

(3) Shelf Life Monitoring

Figure 7:
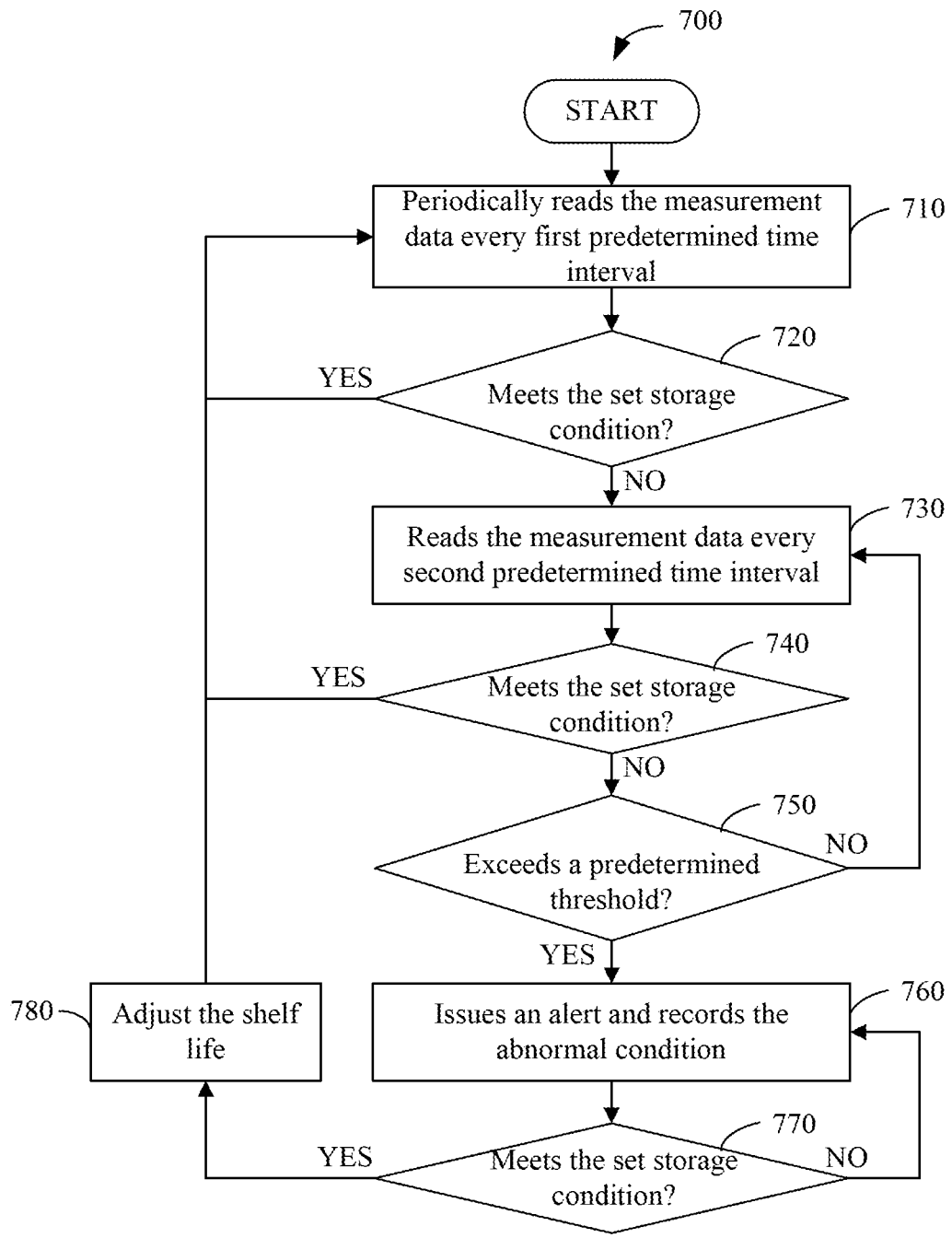
FIG. 7 is a flow chart of one embodiment of a method for monitoring condition of the display cabinet.

FIG. 7 is a process 700 of monitoring the storage conditions of the display cabinet 110 by the server 120 according to one embodiment.

Block 710, the server 120 periodically reads the measurement data of the sensing device 114 at first time intervals. The measurement data includes current temperature and humidity information in the display cabinet 110.

The sensing device 114 returns the measurement data over the communication device 116, and after receiving the measurement data returned by the sensing device 114, the server 120 looks up the storage condition setting of the display cabinet 110 according to the GW_ID of the communication device 116 in the display cabinet database 300 (that is, the value of the storage condition 320 field). The server 120 further determines, according to the received measurement data, whether the current operating condition of the display cabinet 110 meets the set storage condition (Block 720). If the server 120 determines that the current operating condition of the display cabinet 110 does not meet the set storage condition, it is determined that the display cabinet 110 is abnormally operating, and the process 700 proceeds to Block 730. If the server 120 determines that the current operational condition of the display cabinet 110 meets the set storage conditions, the process 700 returns to Block 710.

Block 730, once the server 120 determines that the display cabinet 110 is abnormal, the server 120 reads the measurement data of the sensing device 114 at second time intervals, and records the abnormal condition with the start time. In normal use, the temperature of the display cabinet 110 often rises temporarily because the consumer opens the cabinet door for a long time to select the perishable product. The abnormal temperature condition will be again lowered back to a normal value after the consumer closes the cabinet and the compressor of the display cabinet 110 is activated. The foregoing situation also occurs when the staff replenishes the display cabinet 110. Therefore, it is not necessary to issue an alert immediately when an abnormal situation occurs. The system 100 uses two different time intervals (the first predetermined time interval and the second predetermined time interval), in order to avoid often triggering an alert. The value of the first predetermined time interval and the value of the second predetermined second time interval value may be set according to actual conditions and requirements, but the measurement frequency under abnormal conditions needs to be higher than a normal condition, so the value of the second time interval must be smaller than the value of the first predetermined time interval.

Block 740, the server 120 determines, according to the received measurement data, whether the current operating condition of the display cabinet 110 has met the set storage condition. If so, then return to Block 710 for monitoring of the normal period; otherwise, Block 750 is executed.

Block 750, the server 120 further determines whether the time period of the continuous abnormal condition has exceeded a predetermined threshold according to the time when the measurement data is received and the time when the abnormal condition starts. If the period of time during which the abnormal condition continues to occur has exceeded the predetermined threshold, an alert is issued and continuous recording of the abnormal condition in the abnormal record 330 field of the display cabinet database 300 (Block 760) is carried out. For example, the storage condition of the display cabinet 110 is set to a temperature of 4° C. and a humidity of 40% (the value of the storage condition 320 field), but it is known from recent measurement data that the measurement temperature exceeds the storage condition of 1° C. If the abnormality has been continued for 2 hours and the measured temperature exceeds the storage condition of 2° C. for 1 hour, then in the abnormal record 330 field, record ">+1° C.: 2 HR, >+2° C.: 1 HR". In one embodiment, the alert can be transmitted over the network 140 to any of the locations where the display cabinet 110 is placed to display (sound or video) the alert. In another embodiment, the alert may also notify the staff where the display cabinet 110 is placed by means of a short message service with an abnormal condition occurs in the display cabinet 110, and the error needs to be manually eliminated. If the period during which the abnormal condition continues to occur does not exceed the predetermined threshold, Block 730 monitoring of the abnormal condition period is continued.

Block 770, the server 120 determines, according to the received measurement data, whether the current operating condition of the display cabinet 110 has met the set storage condition (whether the error has been eliminated). If yes, Block 780 is executed to adjust the shelf life of all the perishable products stored in the display cabinet 110 according to the temperature and humidity values and durations of the abnormal condition occurrence time period, and return to Block 710 to perform measurement monitoring during normal operation. If the current operating condition of the display cabinet 110 still does not meet the set storage condition (the error has not been eliminated), then Block 760 is executed to issue an alert again and continue to record the abnormal condition.

Figure 8:
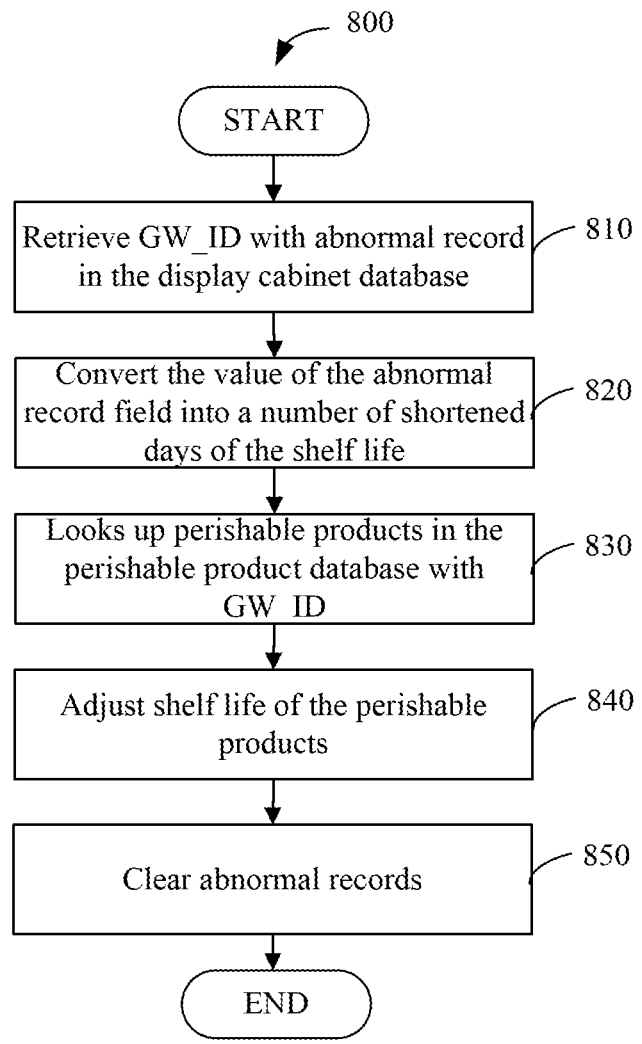
FIG. 8 is a flow chart of one embodiment of a method to adjust shelf life of the perishable product.

FIG. 8 is a process 800 to adjust the shelf life of all the perishable products stored in the display cabinet 110 by the server 120 when the time period in which the abnormal condition of the display cabinet 110 continues exceeds the predetermined threshold.

First, the server 120 looks up the data column in the display cabinet database 300 that the abnormal record 330 field value is not empty, and retrieves the value of the GW_ID 310 field in the data column (Block 810). The GW_ID of the communication device 116 installed in the display cabinet 110 is 1111 as one example.

Next, the value of the abnormality record 330 field is converted into a number of shortened days of the shelf life (Block 820).

Figure 9:
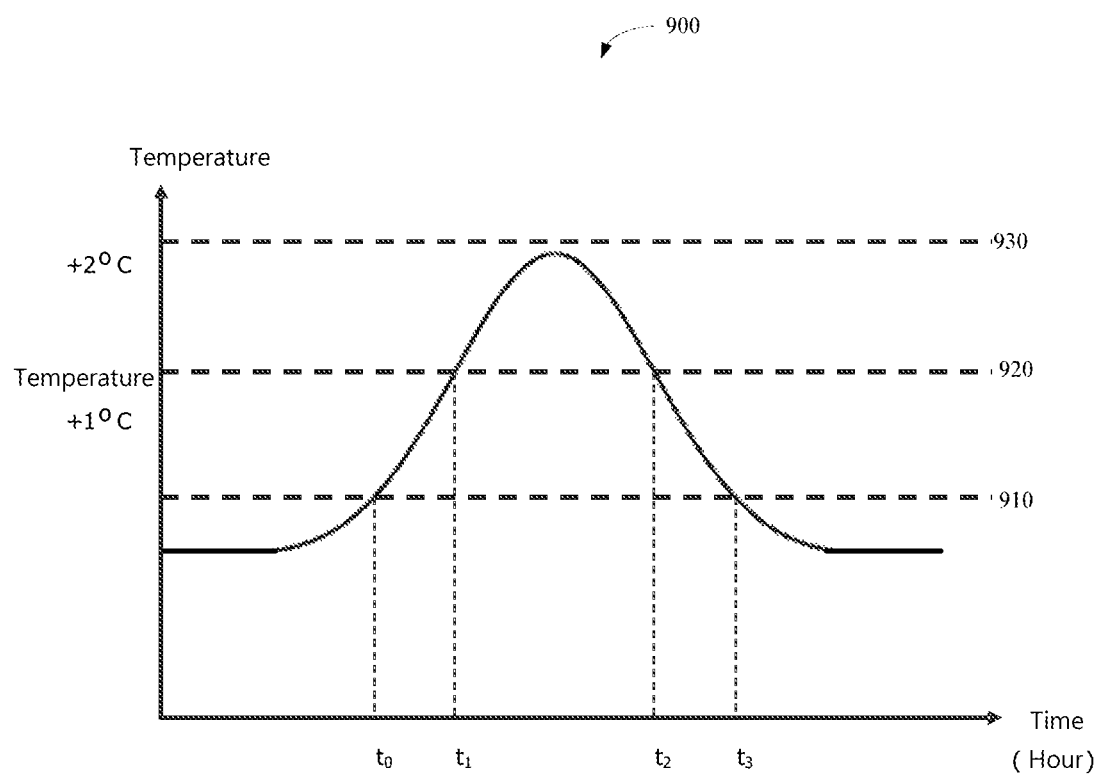
FIG. 9 is a schematic diagram of an abnormal temperature profile of the display cabinet.

FIG. 9 illustrates an abnormal temperature profile 900 of one embodiment of the display cabinet 110. Hereinafter, the abnormal temperature profile 900 will be taken as an example to describe a specific process of converting the value of the abnormal record 330 field into the number of shortened days of the shelf life in one embodiment. The unit of the horizontal axis of the abnormal temperature profile 900 is time, in hours, and the unit of the vertical axis is the temperature value in degrees Celsius. The dashed line 910 is the temperature value of the storage condition of the display cabinet horizontally extended at the vertical axis scale, the dashed line 920 is the temperature value of the storage condition of the display cabinet 110+1° C. horizontally extended at the vertical axis scale. The dashed line 930 is the temperature values of the storage conditions set of the display cabinet 110+2° C. horizontally extended at the vertical axis scale. The time difference between the abnormal temperature curve and the dashed lines 910, 920, and 930, and the time scale values falling on the horizontal axis are t0, t1, t2, and t3, respectively. According to the abnormal temperature curve, T1 (time exceeding the storage condition ⇐1° C.)=(t1−t0)+(t3−t2). T2 (temperature exceeding the storage condition >1° C., ⇐2° C.)=(t2−t1). In one embodiment, the influence of the abnormal temperature and duration to the category of the perishable product stored in the display cabinet 110 on the shelf life is analyzed based on the experimental data, then a comparison table 1000 of FIG. 10 is obtained. In another embodiment, the abnormal temperature and duration may also be converted to a number of shortened days of the shelf life based on historical data or other calculations. In one embodiment, by substituting T1 and T2 retrieved from the abnormal temperature profile 900 into the formula in the comparison table 1000, the number of shortened days of the shelf life could be obtained=f1 (T1)+f2 (T2)=0.1×T1+0.3×T2.

Block 830 in FIG. 8 shows that the server 120 looks up all of the data columns in the perishable product database 500 that have the same value of the GW_ID 540 field as the value of the GW_ID 310 field retrieved in Block 820. In this example, all the data columns of the perishable produce database 500 in which the value of the GW_ID 540 field value is 1111 are found.

Block 840, the value of the shelf life 530 field of all the data columns found by the Block 830 is subtracted from the number of days of the shelf life obtained by the Block 820, thereby obtaining an adjusted shelf life to update the value of the shelf life 530 field.

Block 850, after the shelf life of all affected perishable products has been adjusted (i.e., after updating the value of the shelf life 530 field of the data column found in Block 830), the display is performed. The abnormal record of the display cabinet 110 in the display cabinet database 300 is cleared, that is, the value of the abnormal record 330 field is cleared. The process 800 then terminates.

Figure 11:
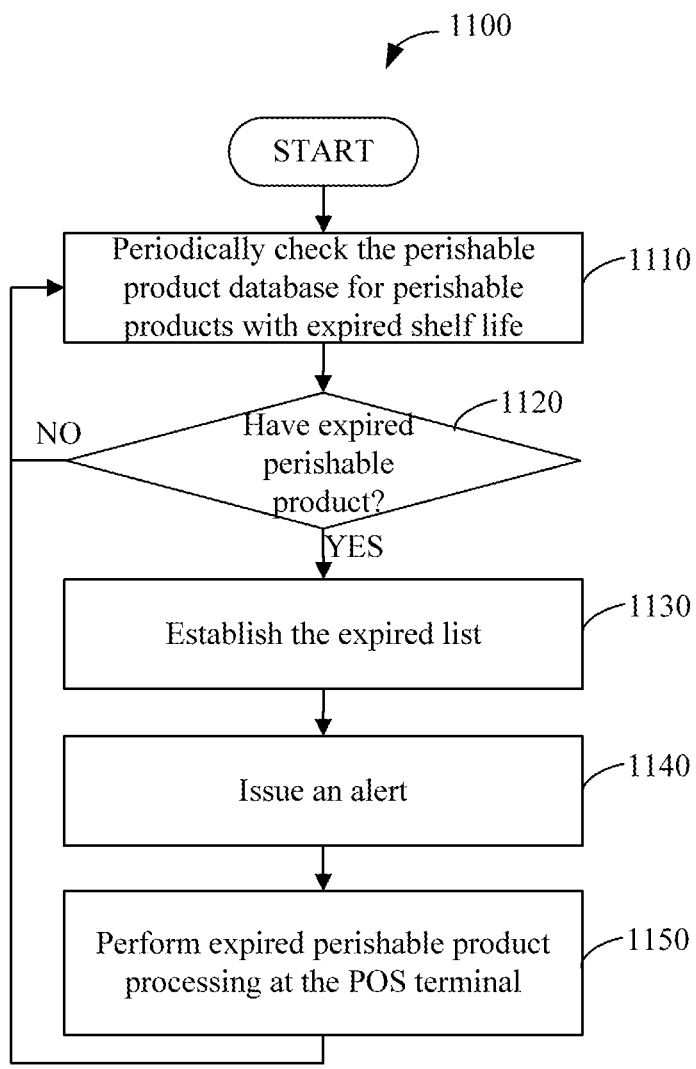
FIG. 11 is a flow chart of one embodiment of a method of shelf life monitoring.

FIG. 11 is a monitoring process 1100 for shelf life accordance to one embodiment.

Block 1110, the server 120 periodically (for example, every 8 hours) checks whether the perishable product database 500 has perishable products which have an expired shelf life (that is, checks the value of the shelf life 530 field of all the data columns in the perishable product database 500).

Block 1120, the server 120 determines whether there is any life-expired perishable product, and if so, proceeds to Block 1130, otherwise returning to Block 1110 to perform regular shelf life monitoring.

Block 1130, the server 120 establishes a list of expired perishable products according to all the data columns determined to be expired perishable products, including the GW_ID of the communication device 116 of the display cabinet 110 for storing expired perishable products and the location where the display cabinet 110 is located.

Block 1140, the server 120 issues an alert that the perishable product is expired, and the alert includes an expired list of expired perishable products. In one embodiment, the alert can be transmitted over the network 140 to any hardware device suitable for displaying (sound or video) the alert at the location where the display cabinet 110 is placed. In another embodiment, the alert can also notify the manager or staff of the store where the display cabinet is placed by means of a short message service or a push notification. If the perishable product is expired, it is necessary to manually find out the expired perishable product according to the expired list, and remove expired perishable products from the display cabinet 110.

Block 1150, the server 120 notifies the POS system of the POS terminal 130 to perform expired perishable product processing (i.e., prohibition of sales of the expired perishable product) at the sales end for the expired perishable product, and lists all expired perishable products from the perishable product database 500. After deletion, return to Block 1110 for periodic shelf life monitoring.

In one embodiment, the server 120 may also monitor perishable products that are about to expire. That is, in Block 1120, the server 120 further determines whether there is any perishable product that is about to expire, and notifies the manager of the display cabinet 110 or the staff at the place of placement, and takes corresponding measures in advance, for example, reducing the price of the perishable product that is about to expire, or moving the perishable product to a more prominent position in the display cabinet 110.

Figure 12:
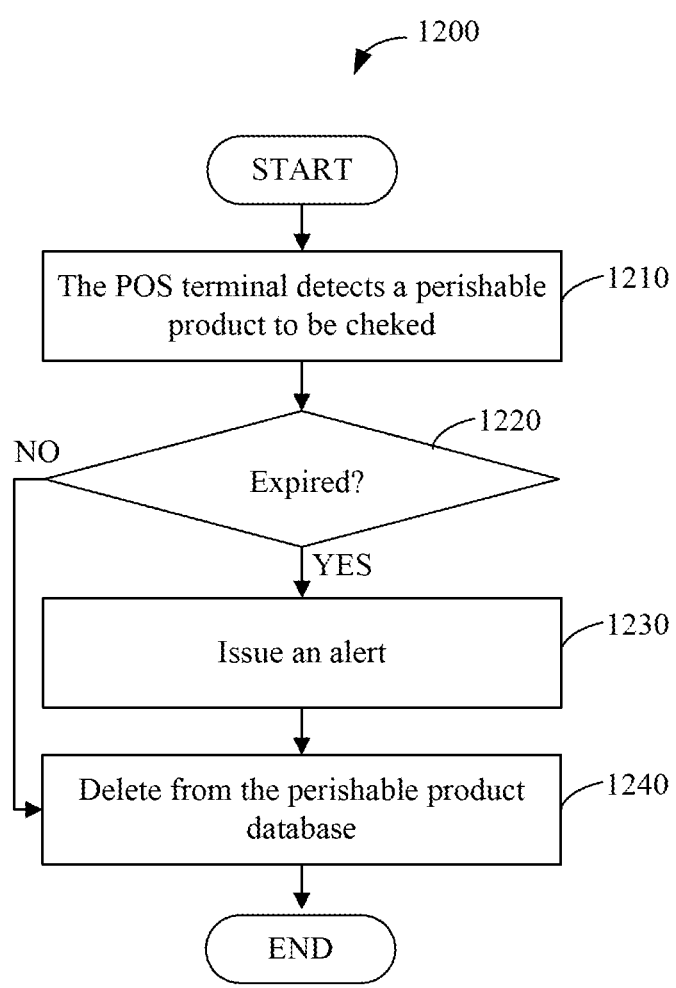
FIG. 12 is a flow chart of one embodiment of a method for passing perishable products through a point-of-sale terminal.

FIG. 12 shows a process 1200 to sell perishable products at the POS terminal 130 accordance to one embodiment.

Block 1210, the reader 132 of the POS terminal 130 detects an electronic tag of the perishable product to be checked.

The POS terminal 130 reads the F_ID of the to-be-checked perishable product from the electronic tag, and uploads it to the server 120. The server 120 looks up the perishable product database 500 for the value of the F_ID 510 field with the F_ID of the to-be-checked perishable product, and determines whether the to-be-checked perishable product has expired (Block 1220). If the to-be-checked perishable product is life-expired, Block 1230 is executed; otherwise, Block 1240 is executed.

Block 1230, the server 120 notifies the POS terminal 130 to issue an alert to interrupt the sales process of the perishable product to be checked. The alert may be displayed on the POS terminal 130 or the display device coupled to the POS terminal 130 by means of sound or video, reminding the staff at the POS terminal 130 that the perishable product to be checked out contains one or more perishable products that has expired, thereby interrupting the subsequent sales process of the perishable product to be checked, and the perishable product is treated as expired and removed from the perishable product database 500.

Block 1240, if the to-be-checked perishable product has no expiration problem, the server 120 notifies the POS terminal 130 that the POS terminal 130 can normally process the checkout, and deletes the checked perishable product from the perishable product database 500.

In summary, the system 100 utilizes the Internet of Things technology to instantly monitor the display cabinet 110 and the perishable products stored therein, and actively notifies any abnormal conditions, including abnormal operation of the display cabinet 110, expired perishable product shelf lift, etc., and re-adjusts the shelf life of the relevant perishable products according to the abnormal condition of the display cabinet to ensure food safety, reduce the maintenance cost of the store, and ensure the goodwill of the store.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A shelf life monitoring system comprising:
an electronic tag attached to a package of products;
at least one display cabinet, the display cabinet comprising:
   a communication device comprising an identification code; and
     a reader electrically coupled to the communication device and adapted for detecting an electronic tag and reading a tag code of the electronic tag;
a server communicatively coupled to the communication device, the server comprising:
   a product database storing the tag code and storage conditions of the products, wherein storage conditions comprise temperature and humidity; and
   a display cabinet database storing an identification code of the display cabinet and a storage condition of the display cabinet, wherein the storage condition of the display cabinet comprises temperature and humidity, wherein:
the reader is configured to upload the tag code of the electronic tag to the server through the communication device,
the server is configured to: look up in the display cabinet database according to the identification code of the communication device, retrieve the storage condition of the display cabinet, look up in the perishable product database according to the tag code of the electronic tag, retrieve the storage condition of the perishable product, and determine whether the storage condition of the display cabinet matches the storage condition of the perishable product, if the server determined that the storage condition of the display cabinet does not match the storage condition of the perishable product, issue an alert.

2. The system of claim 1, wherein the electronic tag comprises a bar code label, a radio frequency identification tag, and a short-range wireless communication tag.

3. A shelf life monitoring system comprising:
a display cabinet adapted for storing products, the display cabinet comprising:
   a communication device, and
     a sensing device electronically coupled to the communication device and adapted for measuring environmental parameter values of the display cabinet; and
a server communicated with the display cabinet through the communication device, the server comprising:
   a database adapted for storing a storage condition of the display cabinet and a shelf life of the products, wherein the server is configured to:

read the environmental parameter values from the sensing device at a first predetermined time interval;

determine whether the display cabinet is operating abnormally according to the environmental parameter values from the sensing device and the storage condition of the display cabinet stored in the database;

record the environmental parameter values and a current time when the display cabinet is operating outside of a range of predetermined environmental parameters; and calculate a number of shortened days of shelf life of products according to a temperature and a duration when the display cabinet is operating abnormally, calculate an updated shelf life of the product by subtracting the number of shorten days from the shelf life, and upload the updated shelf life to the database.

4. The system of claim 3, wherein if the server determines that the operation of the display cabinet is abnormal, the server is further configured to read the environmental parameter values from the sensing device at a second predetermined time interval.

5. The system of claim 4, wherein the server is further configured to issue an alert when the server determined that a temperature of the display cabinet exceeds a predetermined threshold.

6. A shelf life monitoring system, the system comprising:
an electronic tag attached to a package of a product, wherein a tag d of the electronic tag is configured to store an identification code and a shelf life of the product;

a display cabinet, the display cabinet comprising:
a reader electrically adapted for detecting an electronic tag and reading stored information of the electronic tag; and a server, the server comprising:
a database adapted for storing the identification code and the shelf life of the product uploaded by the display cabinet, wherein the server is configured to:
check whether there is a product with an expired shelf life in the database periodically at a predetermined time interval, and
issue an alert while the product is found.

7. The system of claim 6, wherein the alert comprises the identification code of the product which has the expired shelf life.

8. A shelf life monitoring system comprising:
an electronic tag attached to a package of a product;
a server comprising a database adapted for storing an identification code and a shelf life of the product; and
a point of sale terminal communicatively coupled to the server, the point of sale terminal comprising: a reader adapted for detecting and reading a tag code of the electronic tag, wherein
the point of sale terminal is configured to upload the tag code to the server, and the server is configured to look up the database by using the tag code as the identification code of the product, retrieve a shelf life of the product, determine whether the shelf life of the product is expired, and notify the point of sale terminal if the shelf life of the perishable product is expired.

* * * * *